US005787111A

United States Patent [19]
Gilmore

[11] Patent Number: 5,787,111
[45] Date of Patent: Jul. 28, 1998

[54] TRANSPORTABLE COMMUNICATION SYSTEM

[75] Inventor: William E. Gilmore, Richardson, Tex.

[73] Assignee: MCI Communications Corporation, Washington, D.C.

[21] Appl. No.: 654,326

[22] Filed: May 28, 1996

[51] Int. Cl.$^6$ ..................................................... H04B 1/69
[52] U.S. Cl. .......................... 375/200; 375/211; 375/220; 370/328; 455/11.1; 455/422
[58] Field of Search ............................ 375/200, 211, 375/220; 370/279, 335, 328, 338, 390, 400, 401, 402, 407, 412; 455/11.1, 422, 426, 445

[56] References Cited

U.S. PATENT DOCUMENTS

| | | | |
|---|---|---|---|
| 4,759,051 | 7/1988 | Han | 455/437 |
| 5,067,173 | 11/1991 | Gordon et al. | 455/139 |
| 5,184,347 | 2/1993 | Farwell et al. | 370/349 |
| 5,347,304 | 9/1994 | Moura et al. | 370/463 |
| 5,479,400 | 12/1995 | Dilworth et al. | 370/349 |

OTHER PUBLICATIONS

Harry Newton, Newton's Telecom Dictionary, 562–563 (11th ed. 1996).

Primary Examiner—Don N. Vo

[57] ABSTRACT

The present invention relates to a transportable communications system that may be used to provide supplemental communications to a geographic region. The transportable communications system may be used during a special event, such as an emergency. The present invention may be comprised of one or more cell sites, wired access points, and a common point which facilitate communications between one or more user terminals and an established communications network. The established communications network may be a telephone network. The present invention may also employ a cellular network topology.

23 Claims, 9 Drawing Sheets

100

TRANSPORTABLE COMMUNICATION SYSTEM

BACKGROUND OF THE INVENTION

1. Field of the Invention

The present invention relates generally to a transportable communications system, and more specifically to a transportable communications system for use in a disaster environment.

2. Related Art

Modern communities are serviced by wire line and wireless communications systems, such as land line and cellular telephone systems. These systems are designed to carry nominal traffic loads under normal operating conditions. However, during special events, such as emergencies, large traffic loads occur for which the capacities of these systems may be inadequate, and possibly even impaired. For example, during a hurricane, above ground telephone poles, wires, and cellular antennas may be blown down, thereby disrupting commercial communications systems. Only special governmental communications services may remain operational for emergency applications.

SUMMARY OF THE INVENTION

The present invention is a transportable communications system (hereinafter "the system"). The system can be installed in a region requiring supplemental communications services in case of a special event, such as an emergency.

In one embodiment, the invention is implemented with a wireless cellular topology. In this embodiment, the invention comprises a system of cell sites, wired access points (WAPs), and a common point coupling a user terminal to an established communications network, such as a long distance telephone network. As a result, the user terminal and the established communications network can transmit information, such as data and voice, to one another.

A cell is created around each cell site. A user terminal, such as a mobile computer, can roam through contiguous cells while remaining coupled to the established communications network.

This embodiment of the present invention facilitates flexible communications networking. The user terminal can be coupled to the established communications network in a variety of ways. A signal from the user terminal is coupled to a cell site. This signal may then be relayed to either another cell site or to a wired access point. Eventually this signal is relayed from a cell site to a wired access point. The signal may then be relayed to another wired access point or the common point. Finally, the signal is relayed from the common point to the established communications network.

The cell sites, wired access points, and common point of this embodiment are mobile, and may be implemented on trailers or other vehicles to facilitate their rapid deployment. Thus, this embodiment can be situated at different geographical locations. Also, because they are mobile, the components of this embodiment can be installed at locations, such as hilltops, to provide enhanced system performance.

Additionally, the components of this embodiment communicate with one another using spread spectrum modulation. The use of spread spectrum modulation permits the system to operate in the same frequency band with other communications systems in the same geographical region while minimally interfering with those other communications systems.

Therefore, a feature of the present invention is to provide supplemental communications services to a geographical region. Furthermore, an additional advantage of the present invention is the ability to rapidly install the system. Another benefit of the present invention that is that the system minimally interferes with other communications systems located in the same geographic region.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTIONS

1. Overview and Discussion of the Invention

The present invention is directed toward a transportable communications system (hereinafter "the system"). The system provides supplemental communications for a geographical region. The system may be rapidly deployed during special events, such as emergencies.

2. Example Environment

The present invention supports a variety of communications services for many applications. The following embodiment may be used for example, by insurance adjusters, in a disaster area, who wish to quickly resolve claims so that reconstruction can begin. Because conventional communications networks, such as the telephone system, may be crippled during the disaster, the insurance adjusters may not be able to communicate with their home offices to obtain approval for claim settlements and to direct payments to claimants. Therefore it would be desirable to install this embodiment of the present invention in a disaster area, so that insurance adjusters can travel through the disaster area while maintaining contact with their home office.

One embodiment of the present invention may be implemented with a cellular topology. In this embodiment, the invention comprises a system of cell sites, wired access points, and a common point which couple user terminals to an established communications network, such as a long distance telephone network.

Figure 1:
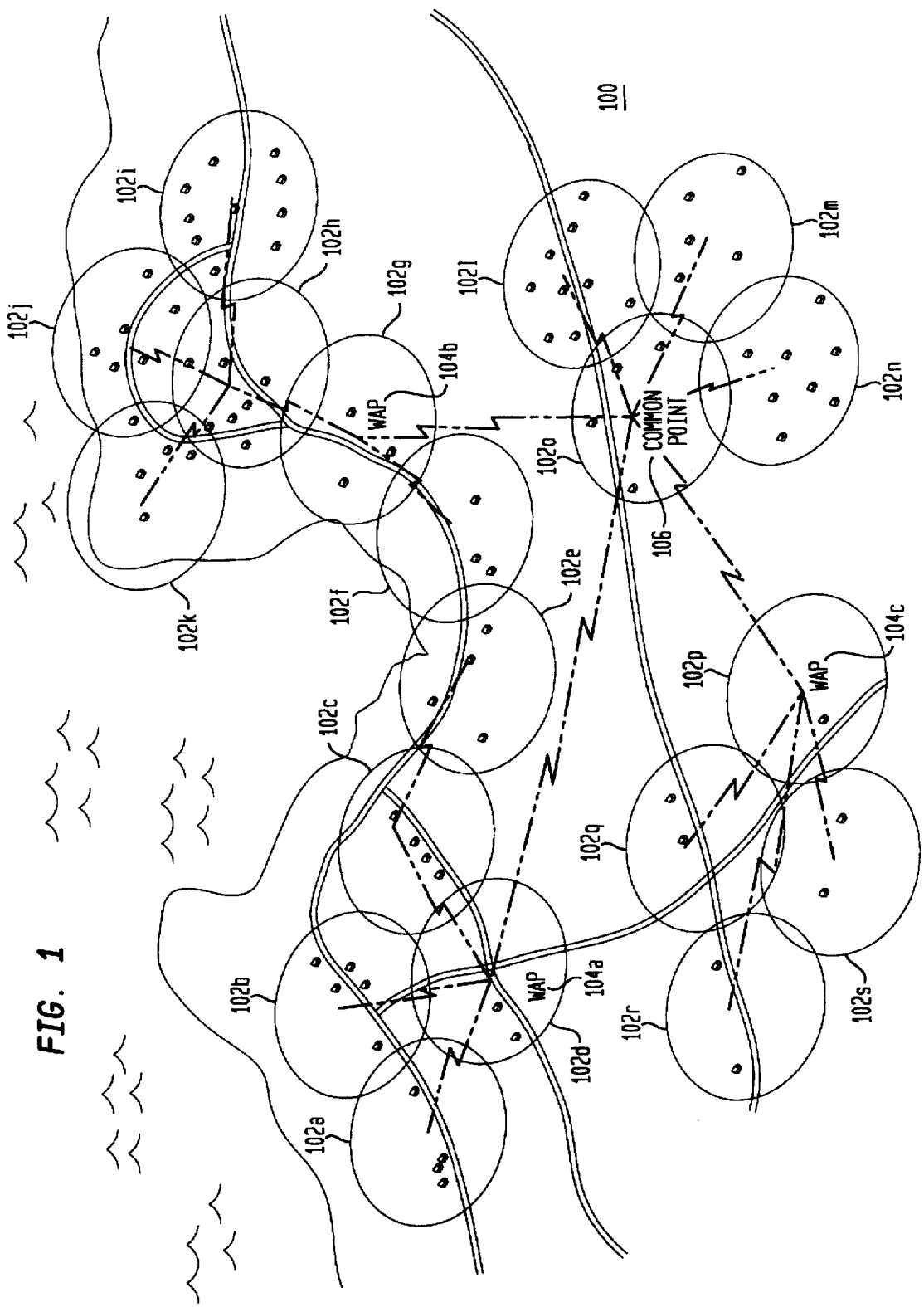
FIG. 1 illustrates a topographical view of one embodiment of the present invention.

FIG. 1 illustrates an example of the cellular topology embodiment of the transportable communications system. FIG. 1 portrays a topological distribution of cells 102a–s. User terminals may roam through contiguous cells 102a–s and maintain communications with the established communications network, such as a long distance telephone network. Signals from the user terminals are broadcast to a cell site in the cell 102a–s in which the user terminal is located. The signals then may be relayed to another cell site (e.g., from cell 102b to cell 102f) or to a wired access point (WAP) 104a–c. From the wired access point 104a–c, the signal is relayed to another wired access point 104a–c (e.g., from WAP 104a to WAP 104c) or to a common point 106. Finally the signal is relayed from the common point 106 to the established communications network (not shown).

Figure 2:
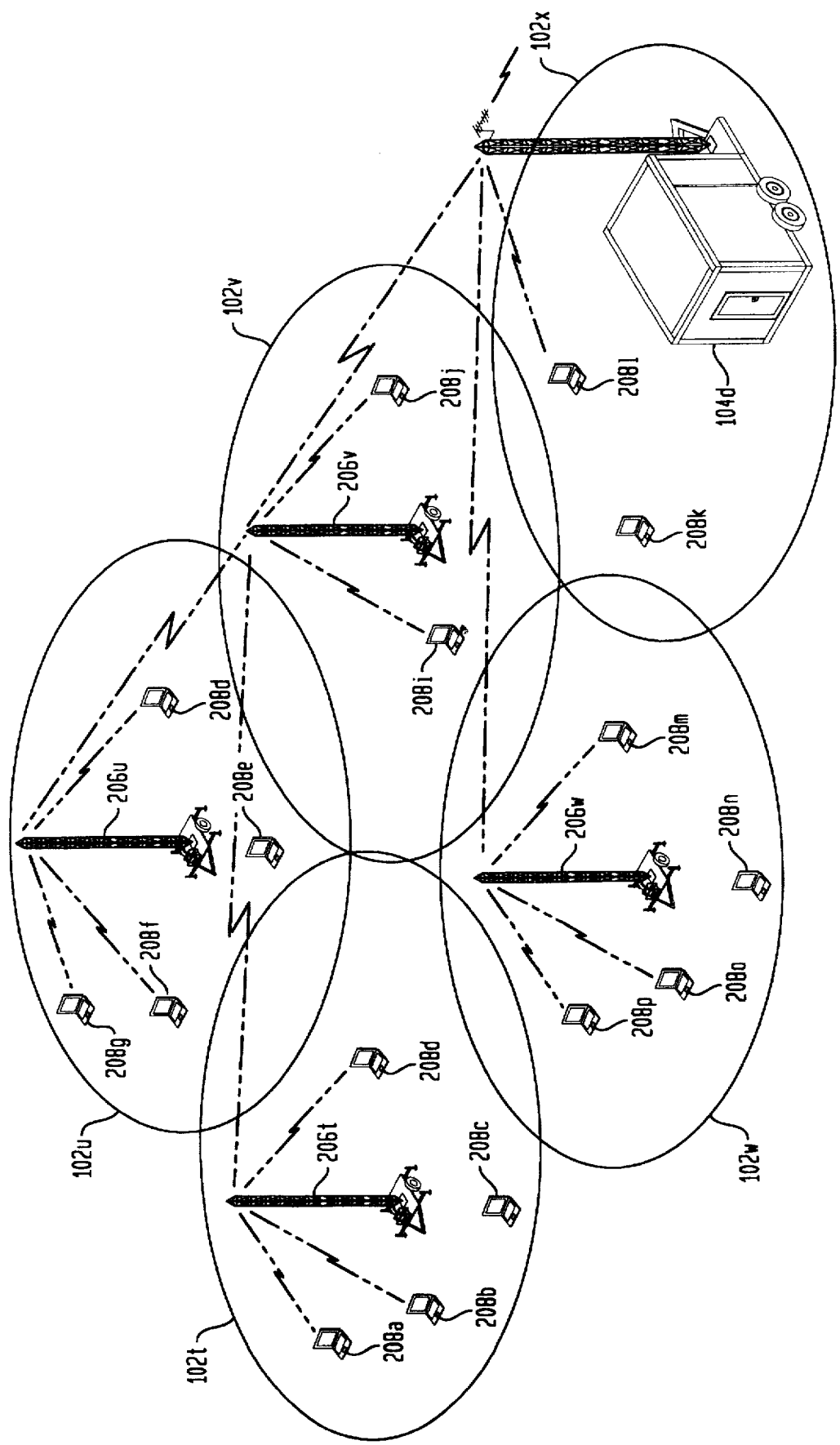
FIG. 2 illustrates a detailed view of one embodiment of cells of the present invention.

FIG. 2 illustrates a more detailed view of cells 102t–x. Each cell 102t–x is defined by a radiation pattern emitted from a corresponding cell site 206t–x. In one embodiment, the radius of each radiation pattern is about three-quarters of a mile. User terminals 208a–p roam within the cells 102t–x and communicate through respective cell sites 206t–w and the WAP 104d.

Figure 3:
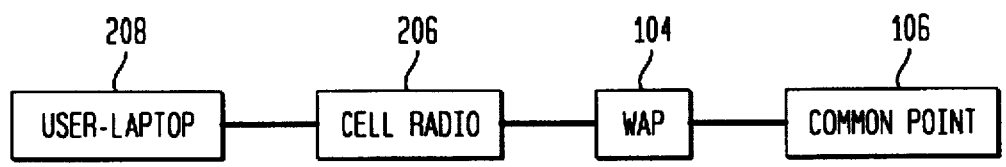
FIG. 3 illustrates a simplified block diagram of one embodiment of the present invention.

FIG. 3 illustrates an alternate embodiment of the system 100. This embodiment is a simplified block diagram of the system 100 which comprises a user terminal 208, a cell site 206, a WAP 104, and a common point 106 coupled in the proceeding order.

In one embodiment of the present invention, the system utilizes spread spectrum modulation to permit multiple users to simultaneously operate on the same frequency band, while minimally interfering with each other and other users of the same frequency band. Furthermore, for this reason, the present invention may not require regulatory approval. In this embodiment, the present invention contemplates using one or more spread spectrum modulation techniques, such as direct sequencing, frequency hopping, and time hopping.

One embodiment of the present invention contemplates that the user terminal 208 is a laptop computer including a wireless communications transceiver. However, the present invention contemplates that the user terminal 208 could be any form or combination of computing and communications devices, such as a palmtop computer.

Figure 4:
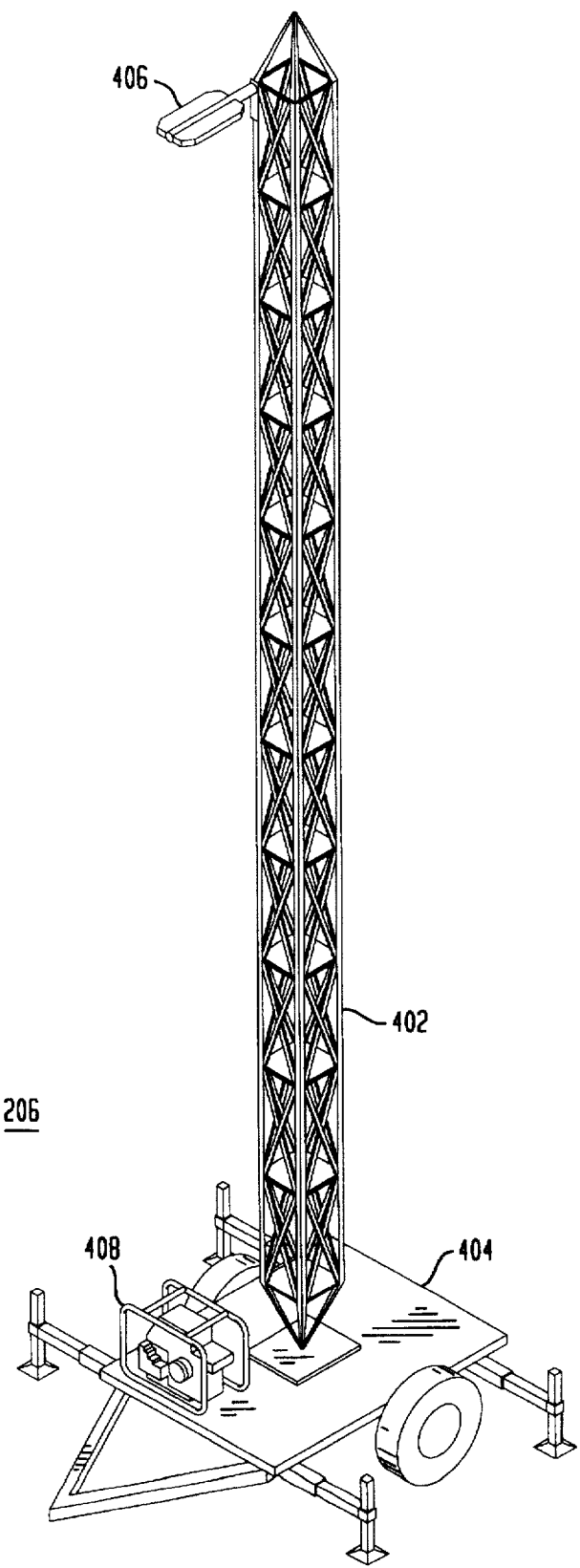
FIG. 4 illustrates one embodiment of a cell site.

FIG. 4 illustrates one embodiment of a cell site 206. The cell site is mobile and is comprised of a tower 402 on a wheeled platform 404. The tower 402 may be telescopic, and thus easily collapsible in preparation for movement. The cell site 206 also includes a wireless cellular transceiver 406 for communicating with user terminals 208, other cells sites 206, a WAP 104, or a common point 106. The wireless cellular transceiver 406 is preferably a Ricochet spread spectrum transceiver (hereinafter "Metricom transceiver") and is manufactured by the Metricom Corporation, although other wireless transceivers could alternatively be used.

The cell site 206 also comprises a power source 408. The power source 408 preferably includes a battery, solar panel, and a generator with a fuel source. In this embodiment, the electronics of the cell site 206, such as the Metricom transceiver, are powered by the battery. Sunlight is converted to electricity by the solar panel to recharge the battery. In the event that the battery discharges and insufficient sunlight is available, then the generator will be engaged to recharge the battery. The WAPs 104 and common point 106 may similarly be powered.

Figure 5:
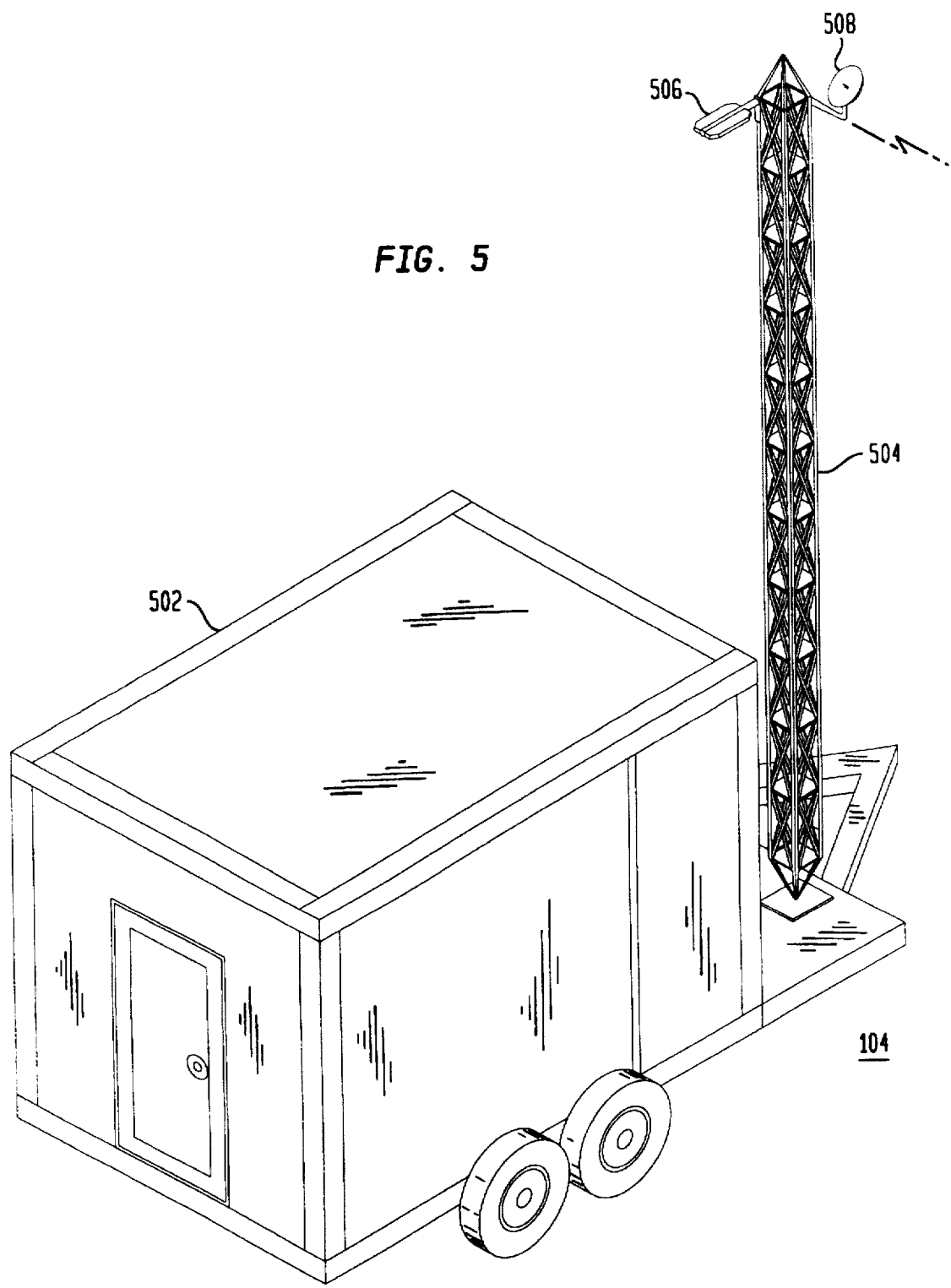
FIG. 5 illustrates one embodiment of a wired access point (WAP)

FIG. 5 illustrates one embodiment of a WAP 104. The WAP 104 comprises a mobile trailer 502, housing communications equipment for the system 100, to which a tower 504 is coupled. Wireless transceivers 506, 508 are coupled to the tower 504 to permit the WAP 104 to communicate with user terminals 208, cell sites 206, other WAPs 104, or a common point 106. One of these wireless transceivers is preferably a Metricom transceiver with an ethernet interface 506. This Metricom transceiver with an ethernet interface 506 permits the WAP 104 to communicate with user terminals 208 and other cell sites 206, and to interface with other digital communications hardware in the WAP 104.

The other wireless transceiver is preferably an Airlink series spread spectrum transceiver (hereinafter "Cylink transceiver") 508 and is manufactured by the Cylink Corporation. However, other spread spectrum transceivers could alternatively be used. The Cylink transceiver 508 permits the WAP 104 to communicate with other WAPs 104 and with the common point 106.

Figure 6:
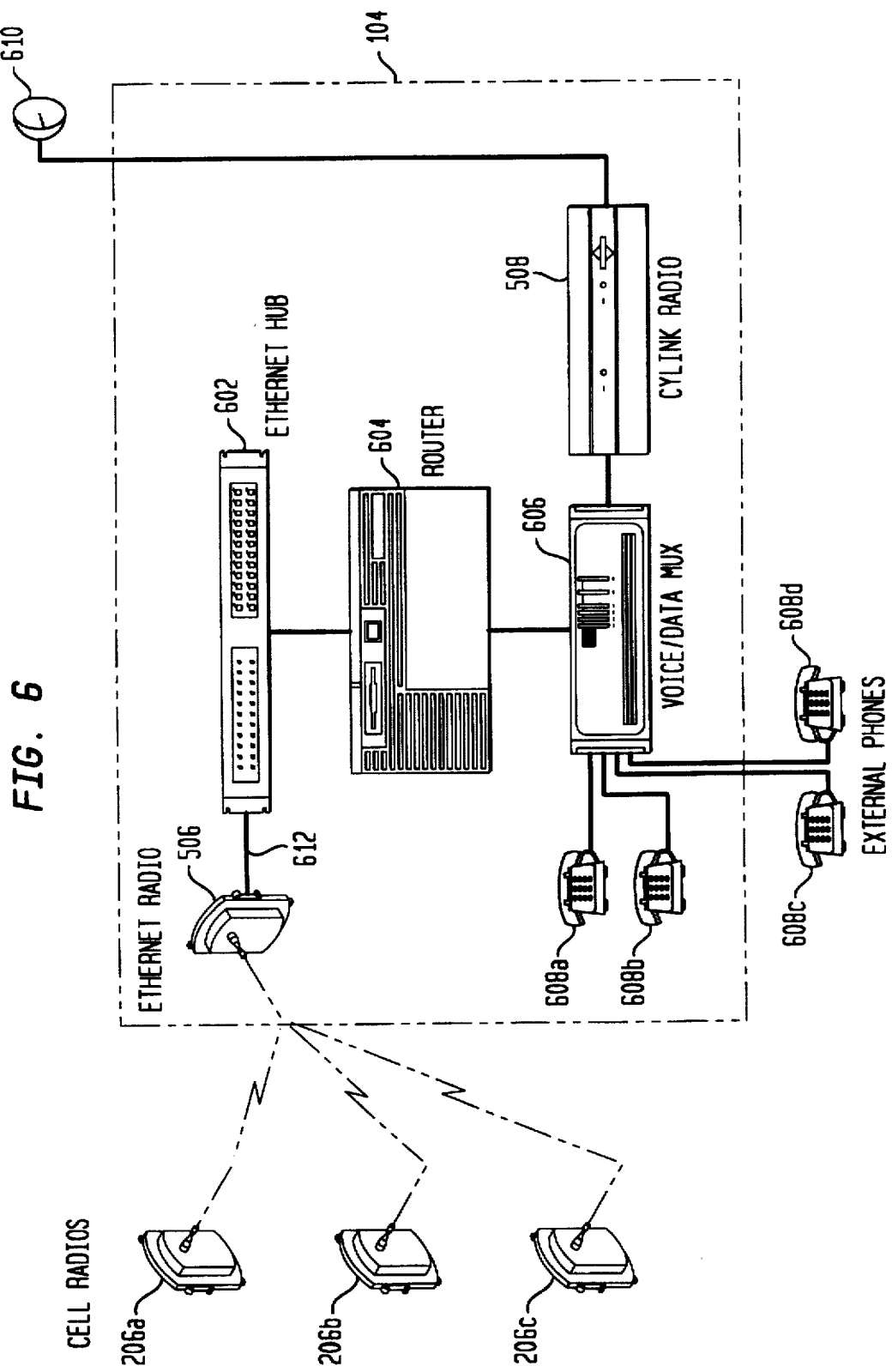
FIG. 6 illustrates a detailed view of one embodiment of a wired access point (WAP)
Figure 7:
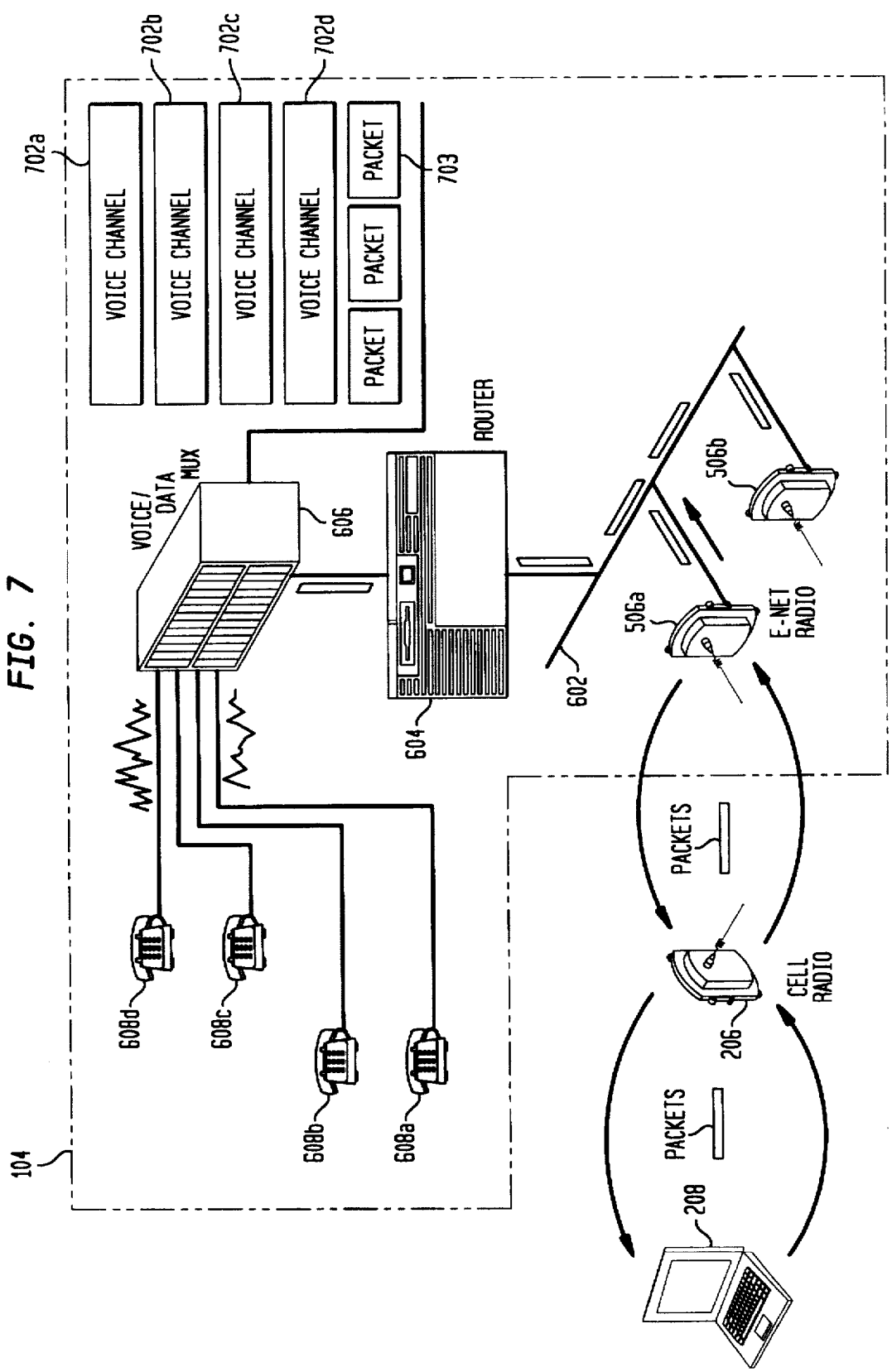
FIG. 7 illustrates an alternative view of one embodiment of a wired access point (WAP)

FIG. 6 illustrates a more detailed embodiment of the WAP 104. The output of the Metricom radio with an ethernet interface 506 is coupled to an ethernet hub 602, which in turn is coupled to a router 604. The ethernet hub 602 includes a transformer and permits multiple Metricom radios with ethernet interfaces 506 to be connected to the ethernet hub 602 with twisted wire 612. The router 604 can combine and separate multiple data streams respectively into or from a single data stream. The separate data streams are sent to or from different Metricom radios with ethernet interfaces 506. The combined data stream is coupled to the Cylink transceiver 508 through a voice/data multiplexer 606. This scheme is also illustrated in FIG. 7 which provides an alternative illustration of a WAP 104.

The combined data stream is then coupled through a voice/data multiplexer 606 with voice information from telephones 608a–d. The voice/data multiplexer 606 places the voice information from each telephone 608a–d and the combined data stream 702e in separate channels 702a–d, 703. These channels 702a–d, 703 are coupled from the voice/data multiplier 606 to a Cylink transceiver 508 and its antenna 610 shown in FIG. 6. The Cylink transceiver 508 and its antenna 610 connect the WAP 104 to another WAP 104 or the common point 106.

Figure 8:
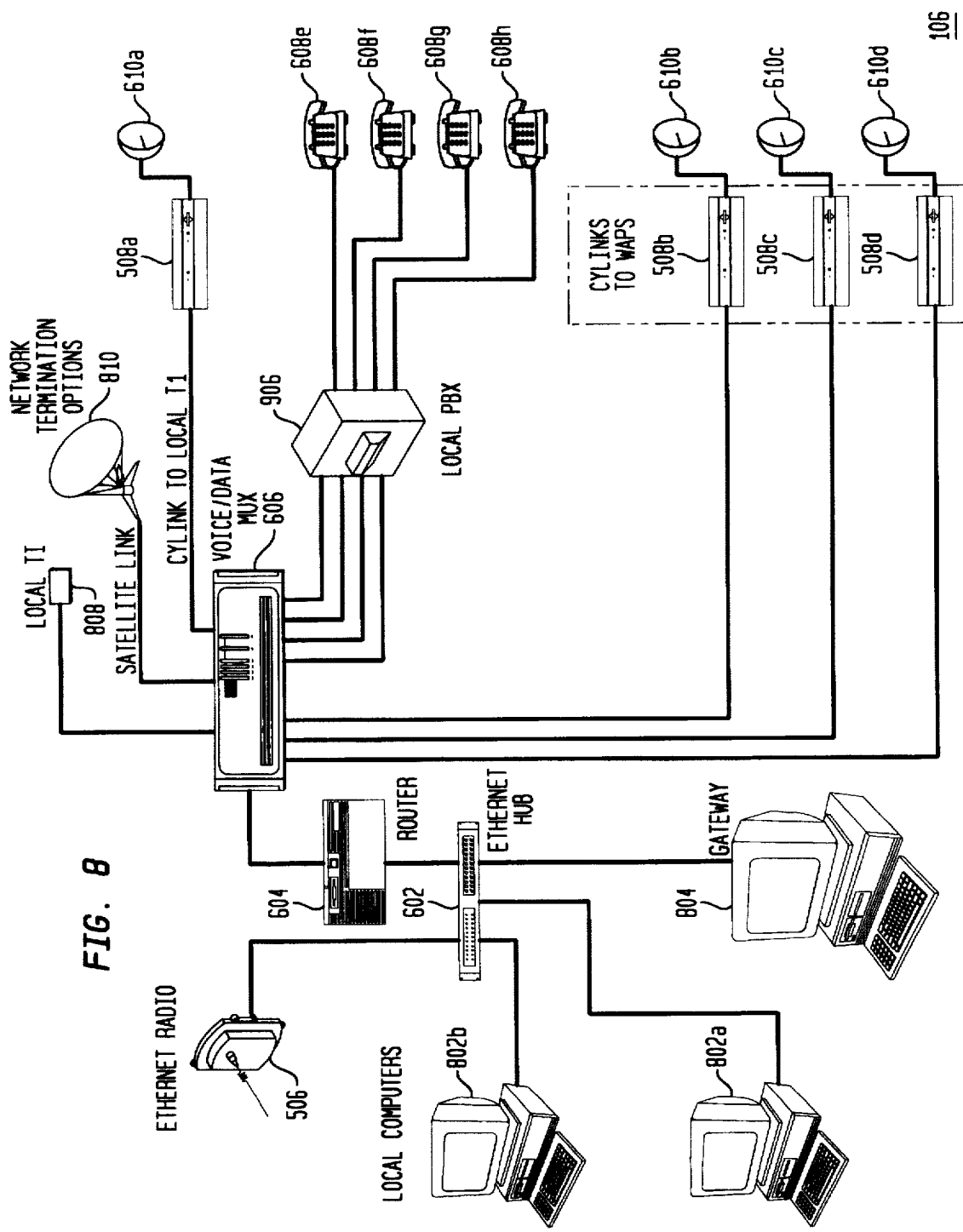
FIG. 8 illustrates one embodiment of a common point.

The system 100 is coupled to an established communications network through the common point 106. FIG. 8 illustrates the preferred embodiment of the common point 106. The common point includes one or more Metricom transceivers with an ethernet interface 506 coupled to an ethernet hub 602. These Metricom transceivers with an ethernet interface 506 couple the common point 106 with cell sites 206 and user terminals 208.

Computers 802a–b and a gateway controller 804 are also coupled to the ethernet hub 602. The computers 802a–b facilitate data entry from the common point 106. The gateway controller 804 includes a database with which the system 100 authenticates the passwords and user identifiers provided by users of the remote terminals 208 and other devices coupled to the system 100. Thus the gateway controller 804 ensures only authorized users may utilize the system 100 and access the established communications network.

The ethernet hub 602 is coupled to a router 604 whose function was previously described. The router 604 is coupled to a voice/data multiplexer 606 whose function was also previously described. However, in the embodiment of the common point illustrated in FIG. 8, telephones 608e–h are coupled to the voice/data multiplexer 606 through a local private branch exchange (PBX) 806. Cylink transceivers 610b–d are also coupled to the voice/data multiplexer 606 to facilitate communications between the common point 106 and one or more WAPs 104.

The common point 106 may couple the system 100 to the established communications network through a wireline, such as T1 telephone line 808. Alternatively, the common point 106 may couple the system 100 to the established communications network through a satellite link 810 or a Cylink transceiver 508a.

Figure 9:
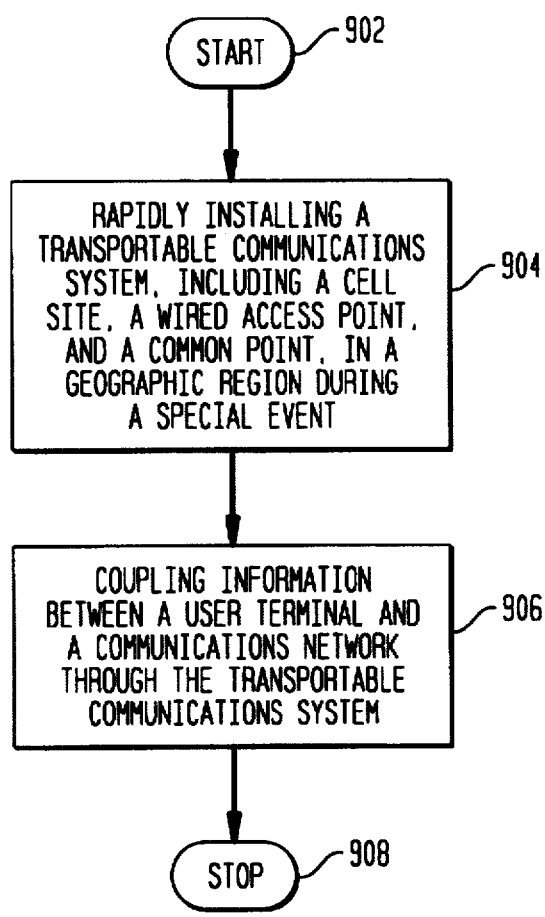
FIG. 9 illustrates a flow chart of exemplary operation of the present invention.

FIG. 9 illustrates a flow chart of exemplary operation of the present invention. Upon commencement of a special event (step 902), the transportable communications system 100, including a cell site 206, a wired access point 104, and a common point 106, are rapidly installed in a geographic region (step 904). The cell site 206, wired access point 104, and common point 106 may be positioned on geographic locations which will enhance the performance of the transportable communications system 100. For example, the cell sites 206 could be located on hilltops to increase the area of the cells 102. As a result, fewer cell sites 206 would be required to be used in the transportable communications system 100 for a given region.

The system 100 is connected to an established communications network through the common point 106. Subsequently, information may be coupled between a user terminal 208 and the established communications network (step 906). Information transfer is preferably accomplished using wireless and spread spectrum methods. Upon cessation of the special event, use of the system 100 is halted (step 908). The system 100 is then dismantled and may be deployed elsewhere.

The present invention is described in terms of this example environment. Description in these terms is provided for convenience only. It is not intended that the invention be limited to application in this example environment. In fact, after reading the preceding description, it will become apparent to a person skilled in the relevant art how to implement the invention in alternative environments.

3. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A transportable communications system for handling information exchange in a special event environment, comprising:

a plurality of user terminals;

a plurality of deployable cell sites wirelessly coupled to one of said plurality of user terminals;

a plurality of deployable wired access points, wherein one of said plurality of wired access points is wirelessly coupled to one of said plurality of cell sites;

a deployable common point wirelessly coupled to said plurality of wired access points; and a communications network coupled to said common point.

2. The communications system of claim 1 wherein each of said plurality of user terminals includes a spread spectrum transceiver.

3. The communications system of claim 2 wherein said one of said plurality of cell sites includes a second spread spectrum transceiver.

4. The communications system of claim 3 wherein each of said plurality of wired access points includes:

a third spread spectrum transceiver;

a telephone; and a multiplexer coupling said telephone and said third spread spectrum transceiver.

5. The communications system of claim 4 wherein said common point comprises:

a gateway controller;

a fourth spread spectrum transceiver; and a router coupling said gateway controller, said fourth spread spectrum transceiver, and said communications network.

6. The communications system of claim 5 wherein said common point is coupled to said communications network by a wire line.

7. The communications system of claim 5 wherein said common point is coupled to said communications network by a satellite link.

8. The communications system of claim 5 wherein said common point is coupled to said communications network by a fifth spread spectrum transceiver.

9. The communications system of claim 5 wherein each of said plurality of wired access points further comprises:

a fifth spread spectrum transceiver; and a router coupled to said third spread spectrum transceiver, said fifth spread spectrum transceiver, and said multiplexer.

10. The communications system of claim 9 wherein each of said plurality of wired access points further comprises an ethernet hub coupled between said third spread spectrum transceiver, said fifth spread spectrum transceiver, and said router.

11. The communications system of claim 10 wherein said one of said plurality of said cell sites comprises a power source means for supplying power to said one of said plurality of said cell sites.

12. The communications system of claim 10 wherein said one of said plurality of wired access points comprises a power source means for supplying power to said one of said plurality of wired access points.

13. The communications system of claim 10 wherein said common point comprises a power source means for supplying power to said common point.

14. A transportable communications system for handling information exchange in a special event environment comprising:

user terminal means for transmitting and receiving information to and from a remote destination;

cell site means, coupled to said user terminal means, for relaying said information to and from said remote destination;

wired access point means, coupled to said cell site means, for relaying said information to and from said remote destination;

common point means, coupled to said wired access point means, for relaying said information to and from said remote destination;

deploying means for rapidly installing said cell site means, said wired access point means, and said common point means in said remote destination; and communications network means, coupled to said common point means, for relaying said information to and from said remote destination.

15. The communications system of claim 14 wherein said cell site means comprises a power source means for supplying power to said cell site means.

16. The communications system of claim 14 wherein said wire access point means comprises a power source means for supplying power to said wired access point means.

17. The communications system of claim 14 wherein said common point means comprises a power source means for supplying power to said common point means.

18. A method of employing a transportable communications system, comprising the steps of:

installing rapidly the transportable communications system, including a cell site, a wired access point, and a common point, in a geographic region during a special event; and coupling information between a user terminal and a communications network through the transportable communications system.

19. The method of claim 18 wherein said step of installing includes the step of positioning said cell site, said wired access point, and said common point on geographic locations which enhance the performance of the transportable communications system.

20. The method of claim 18 wherein the step of coupling information includes the step of modulating the information using a spread spectrum technique.

21. The method of claim 18 wherein said special event is a disaster.

22. The method of claim 21 wherein said user terminal is utilized by an insurance adjuster to communicate with a home office of said insurance adjuster.

23. The method of claim 22 wherein the step of coupling information includes the step of modulating the information using a spread spectrum technique.

* * * * *